United States Patent
Hinz

(10) Patent No.: US 7,626,384 B2
(45) Date of Patent: Dec. 1, 2009

(54) MAGNETO-RESISTIVE SENSOR WITH TEST MODE ACTIVATION

(75) Inventor: Michael Hinz, Hamburg (DE)

(73) Assignee: NXP, B.V., Eindhoven (NL)

( * ) Notice: Subject to any disclaimer, the term of this patent is extended or adjusted under 35 U.S.C. 154(b) by 281 days.

(21) Appl. No.: 10/592,188

(22) PCT Filed: Mar. 4, 2005

(86) PCT No.: PCT/IB2005/050807

§ 371 (c)(1),
(2), (4) Date: Aug. 13, 2007

(87) PCT Pub. No.: WO2005/090920

PCT Pub. Date: Sep. 29, 2005

(65) Prior Publication Data

US 2008/0258716 A1    Oct. 23, 2008

(30) Foreign Application Priority Data

Mar. 16, 2004    (EP)   ................................. 04006237

(51) Int. Cl.
*G01R 33/09* (2006.01)
*G01R 33/12* (2006.01)
*H01L 43/08* (2006.01)

(52) U.S. Cl. ...................... 324/252; 324/210; 338/32 R

(58) Field of Classification Search ................. 324/202, 324/207.21, 252; 338/32 R; 327/510; 257/421, 257/425, 427; 33/355 R, 356, 357
See application file for complete search history.

(56) References Cited

U.S. PATENT DOCUMENTS

| | | | |
|---|---|---|---|
| 5,696,445 A | 12/1997 | Inbar et al. | |
| 5,808,273 A | 9/1998 | Galster et al. | |
| 6,294,911 B1 * | 9/2001 | Shimazawa et al. | 324/210 |
| 6,427,349 B1 * | 8/2002 | Blank et al. | 33/356 |
| 6,433,545 B1 * | 8/2002 | Kunze et al. | 324/252 |
| 7,458,166 B2 * | 12/2008 | Parks et al. | 33/356 |

* cited by examiner

*Primary Examiner*—Kenneth J Whittington

(57) ABSTRACT

According to an example embodiment, there is a magneto-resistive (MR) sensor having an operation mode and a test mode. The MR sensors comprise a first plurality of first MR elements and a second plurality of second MR elements. A first signal processing unit is connected to the first plurality of first MR elements for generating a first output signal; the first output signal has a first phase. As second signal processing unit is connected to the second plurality of second MR elements for generating a second output signal; the second output signal has a second phase. There is a third signal processing unit or processing the first and second output signals; the third signal processing unit is adapted to activate one of the operation mode and the test mode on the basis of the first and second output signals. When the first and second plurality of first and second MR elements are exposed to a homogeneous magnetic field, the third signal processing unit is adapted to activate the test mode.

6 Claims, 2 Drawing Sheets

MAGNETO-RESISTIVE SENSOR WITH TEST MODE ACTIVATION

The present invention relates to the field of magneto-resistive sensors. In particular, the present invention relates to a magneto-resistive sensor, to a method of operating a magneto-resistive sensor, to a method of at least one of testing and trimming a magneto-resistive sensor and to a device for at least one of testing and trimming of a magneto-resistive sensor.

Magneto-resistive sensor elements are becoming more and more widespread. In particular, in the automotive industry, magneto-resistive sensors are required, which fulfill high standards with respect to quality, preciseness and security.

Such sensors usually consist of a plurality of magneto-resistive elements and signal processing units, for example, in the form of an integrated circuit to evaluate and transform the output signals of the magneto-resistive elements into output signals. For example, such magnetic field sensors may be used to measure a position and a rotational speed of, for example, a shaft. In cooperation with mechanical components like active or passive encoders, such sensors may generate analog sinus signals which are transformed into digital signals.

As indicated above, in particular in automotive applications, sensors must fulfill properties and requirements with respect to quality, accuracy and safety. Tolerances of sensor systems, for example, caused by non-linearities of the magneto-resistive elements or caused by variances in the production may have an impact on the performance and have to be compensated by using testing and trimming methods before mounting. Conventional magnetic field sensors are tested and trimmed with simple magnetic coils. For example, an offset of such sensors may be compensated by adjusting a magnet attached to the back of the sensor.

For activating a test mode allowing for a testing and trimming of the sensors, the sensors are usually provided with a test mode activation pin. An application of a voltage significantly higher than a normal supply voltage of the sensor is applied to the test mode activation pin for activating the test mode. However, this requires the provision of an extra test mode activation pin on the sensor. Furthermore, the wiring of the sensor becomes more complicated since a further line has to be provided having a higher potential. Furthermore, such systems are prone to EMV influence.

It is an object of the present invention to provide for an improved magneto-resistive sensor.

According to an exemplary embodiment of the present invention, a magneto-resistive sensor is provided comprising a first plurality of first magneto-resistive elements and a second plurality of second magneto-resistive elements. Furthermore, a first signal processing unit is provided, which is connected to the first plurality of first magneto-resistive elements for generating a first output signal. The first output signal has a first phase. Furthermore, a second signal processing unit is provided which is connected to the second plurality of second magneto-resistive elements for generating a second output signal. The second output signal has a second phase. The sensor has an operation mode and a test mode. According to an aspect of this exemplary embodiment of the present invention, the test mode may be adapted to adjust, for example, an offset of the magneto-resistive elements and to trim the magneto-resistive elements to, for example, compensate for production variations.

A third signal processing unit is provided for processing the first and second output signals of the first and second signal processing units. The third signal processing unit is adapted to activate one of the operation mode and the test mode on the basis of the first and second output signals.

According to this exemplary embodiment of the present invention, the third signal processing unit is adapted to activate the test mode when the first and second magneto-resistive elements are exposed to a homogenous magnetic field.

Advantageously, this allows for a very simple and secure activation of the test mode of the magneto-resistive sensor by applying a homogenous magnetic field to the magneto-resistive elements. Advantageously, this may allow for a simplified wiring of the magneto-resistive sensor, since no further line has to be provided having a higher potential. Furthermore, since homogenous magnetic fields, in normal circumstances, do not occur in the application areas of such magneto-resistive sensors, an unwanted activation of the test mode may be avoided and thus a highly safe system may be provided. Furthermore, no extra test mode activation pin has to be provided, which may in particular be advantageous if the first, second and third signal processing units are integrated as an integrated circuit.

According to an aspect of this exemplary embodiment, the application of an inhomogeneous magnetic field to the magneto-resistive elements of the magneto-resistive sensor causes a phase difference of essentially 90° between the first and second output signals.

According to another exemplary embodiment of the present invention, the third signal processing unit is adapted to activate test modes when the phase difference between the first phase and the second phase is essentially one of 0° and 180°, i.e. one of 0 and $\pi$.

Advantageously, this may allow for a simple arrangement and circuitry of the third signal processing unit. Furthermore, this may allow for the provision of a magneto-resistive sensor, which is easy and cheap to manufacture.

According to another exemplary embodiment of the present invention, the magneto-resistive elements are arranged in a bridge arrangement. The first signal processing units are connected to the magneto-resistive elements such that the first signal processing unit processes the measurement signals of magneto-resistive elements of a first half bridge and the second signal processing unit processes measurement signals of magneto-resistive elements of a second half bridge. Advantageously, due to this arrangement, in case a homogenous magnetic field is provided to the magnetic magneto-resistive elements, a signal level of one of the first and second output signals of the first and second signal processing units is below a pre-set level. For example, if the sensor is well-trimmed and the homogenous magnetic field is ideally homogenous, one of the first and second output signals may essentially be 0. This allows for a very simple and safe activation of the test mode. Furthermore, the circuitry of the first, second and third signal processing units is simple and robust.

According to another exemplary embodiment of the present invention, the first and second pluralities of first and second magneto-resistive elements are geometrically displaced with respect to each other. For example, the magneto-resistive elements of each half bridge are arranged at a certain distance from each other. Furthermore, according to this exemplary embodiment of the present invention, the sensor is one of a position sensor, revolution speed sensor and angle sensor in particular for automotive applications where accurate and safe sensors are required.

According to another exemplary embodiment of the present invention, the third signal processing unit is adapted to activate the operation mode when the first and second plurality of first and second magneto-resistive elements are at least one of exposed to the homogenous magnetic field and exposed to the inhomogeneous fields. Advantageously, this may allow for a very simply switching from the test mode to the operation mode.

According to another exemplary embodiment of the present invention, a method of operating a magneto-resistive sensor is provided. Advantageously, this method may be applied to operate a magneto-resistive sensor according to the exemplary embodiments of the present invention discussed earlier. In the method of operating a magneto-resistive sensor, the test mode is activated when a homogenous magnetic field is applied to the magneto-resistive elements of the sensor. Advantageously, this may allow for a fast and secure activation of the test mode, in particular due to the fact that in nature, homogenous magnetic fields usually do not occur.

According to another exemplary embodiment of the present invention, a method of at least one of testing and trimming a magneto-resistive sensor is provided, wherein a homogenous magnetic field is applied to the magneto-resistive sensor and one of a testing and trimming of the magneto-resistive sensor is performed when the homogenous magnetic field is applied to the sensor. This may allow for a fast and simple testing or trimming of the magneto-resistive sensor.

According to another exemplary embodiment of the present invention, a device is provided for at least one of testing and trimming a magneto-resistive sensor. According to an exemplary embodiment of the present invention, the device comprises a coil arrangement adapted to generate a homogenous magnetic field.

According to another exemplary embodiment of the present invention, the coil arrangement comprises a Helmholtz coil arrangement.

It may be seen as a gist of an exemplary embodiment of the present invention that a test mode of a magneto-resistive sensor is activated by applying a homogenous magnetic field to the magneto-resistive sensor. For this, the magneto-resistive according to the present invention is provided with a circuitry, which, from measurement signals of the magneto-resistive elements, determined that a homogenous magnetic field is applied to the sensor and then switches an operation mode of the magneto-resistive sensor to a test mode. During the test mode, a testing and trimming and adjusting of the sensor is possible.

These and other aspects of the present invention will become apparent from and elucidated with reference to the embodiments described hereinafter.

Exemplary embodiments of the present invention will be described in the following, with reference to the following drawings.

Figure 1:
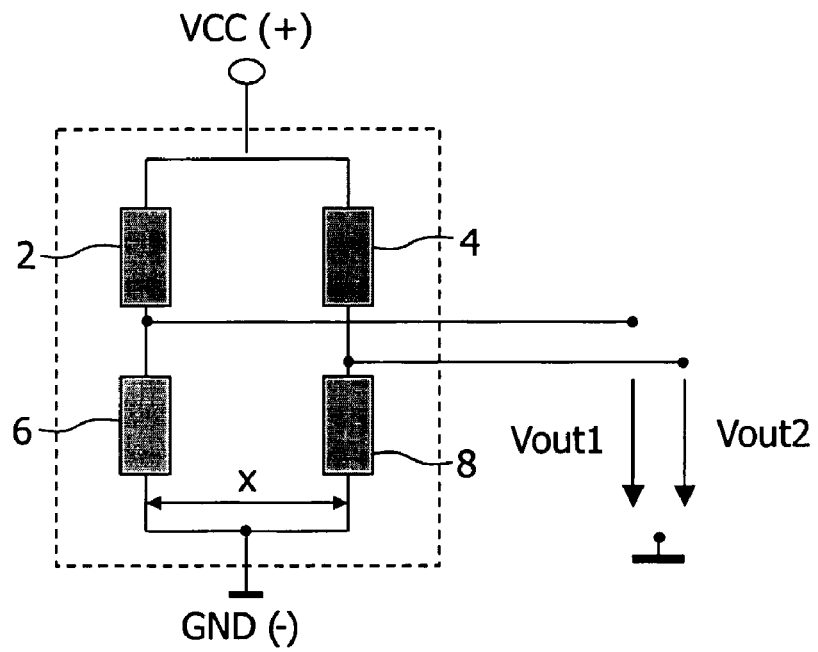
FIG. 1 shows a simplified circuit diagram of a first exemplary embodiment of an arrangement of magneto-resistive elements of a magneto-resistive sensor according to the present invention.

FIG. 1 shows a schematic circuit diagram of a first exemplary embodiment of an arrangement of magneto-resistive elements of a magneto-resistive sensor according to the present invention. Reference numerals 2, 4, 6 and 8 designate magneto-resistive elements. As may be taken from FIG. 1, the magneto-resistive elements 2 and 6 are arranged to form a first half bridge and the magneto-resistive elements 4 and 8 are arranged to form a second half bridge. The magneto-resistive elements 2 and 6 of the first half bridge are respectively arranged such that they are geometrically separated from the magneto-resistive elements 4 and 8 of the second half bridge. For certain applications, it may be advantageous to arrange the magneto-resistive elements of the respective half bridges at different distances from each other.

As may be taken from FIG. 1, a first signal is taken from a connection between the magneto-resistive elements 2 and 6. This signal to ground is referred to as Vout1. Furthermore, a second signal is taken from the connection between the magneto-resistive elements 4 and 8. This signal to ground is referred to as Vout2. In other words, as may be taken from FIG. 1, two signals are taken from the respective half bridge connections.

Figure 2:
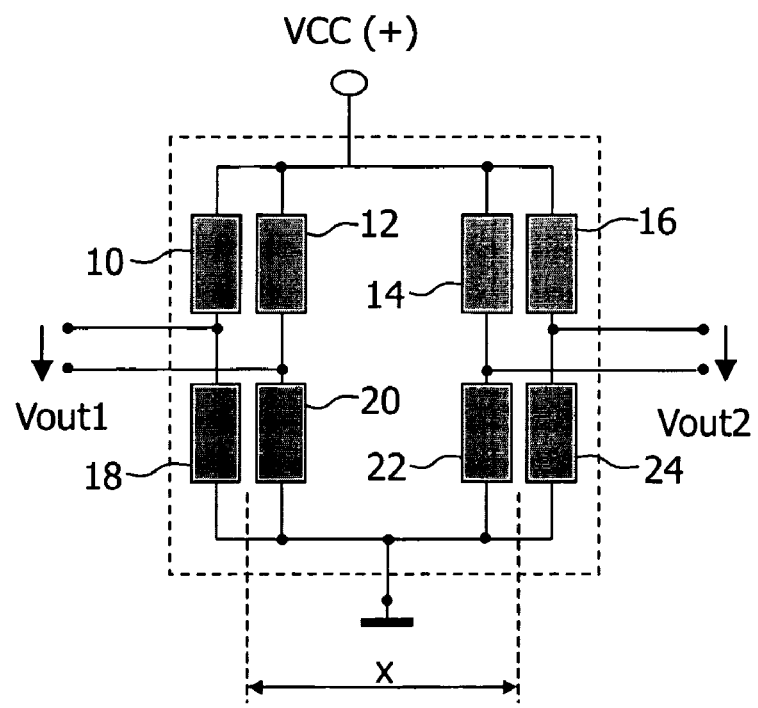
FIG. 2 shows a simplified circuit diagram of a second exemplary embodiment of an arrangement of magneto-resistive elements of a magneto-resistive sensor according to the present invention.

FIG. 2 shows another schematic circuit diagram of a second exemplary embodiment of an arrangement of magneto-resistive elements of a magneto-resistive sensor according to the present invention. As may be taken from FIG. 2, a plurality of magneto-resistive elements such as magneto-resistive resistors 10, 12, 14, 16, 18, 20, 22 and 24 are provided. As may be taken from FIG. 2, the magneto-resistive elements 10, 12, 14, 16, 18, 20, 22, and 24 form two full bridges, which are geometrically separated from each other. Between the two full bridges, a distance x is provided. A signal Vout1 is taken from the connections between magneto-resistive elements 10 and 18, and 12 and 20 respectively. Furthermore, a second measurement signal Vout2 is taken from the connections of magneto-resistive elements 14 and 22, and 16 and 24 respectively.

In the following, with reference to FIG. 3, a circuitry to which the wheatstone bridges shown in FIGS. 1 and 2 can be connected according to an exemplary embodiment of the present invention, will be described.

Figure 3:
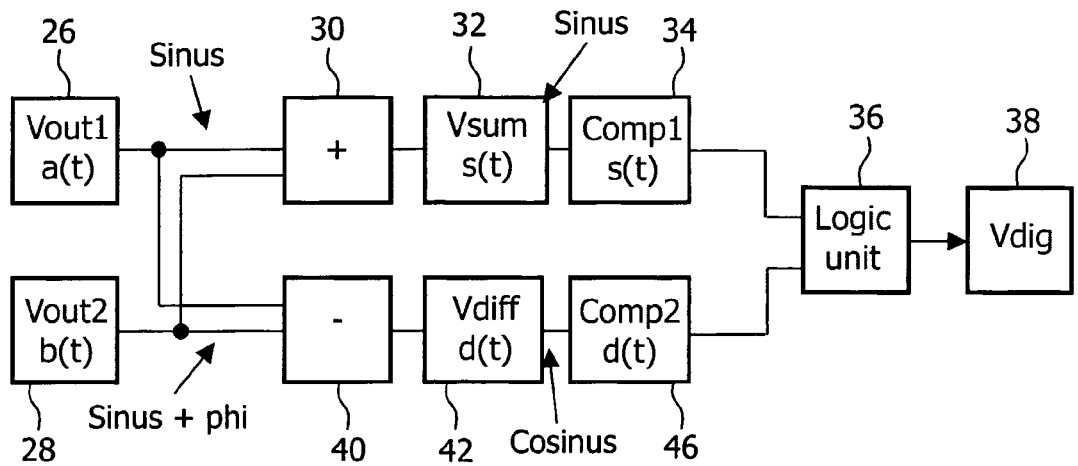
FIG. 3 shows a simplified block diagram of an electronic circuitry of a magneto-resistive sensor according to the present invention as it may be used in combination with the arrangements of magneto-resistive shown in FIGS. 1 and 2.

FIG. 3 shows a simplified block diagram of a circuitry, which may be provided in combination with the magneto-resistive elements in the arrangements shown in FIGS. 1 and 2 to form a magneto-resistive sensor according to the present invention.

Reference numerals 26 and 28 designate signal input means for inputting signals Vout1 and Vout2 measured as shown in FIG. 1 or 2 to the signal processing circuitry. As may be taken from FIG. 3, the circuitry depicted in FIG. 3 may be divided into a first signal processing unit comprising elements 30, 32 and 34 and a second signal processing unit comprising elements 40, 42 and 46. The output signals of the first and second signal processing units are input to a third signal processing unit comprising elements 36 and 38.

In detail, the signals Vout1 and Vout2 are input to an adder 30 and to a subtractor 40. The adder adds the signals Vout1 and Vout2 and forms a sum signal Vsum, which is then input to a comparator Comp1 designated by reference numeral 34.

The output signals Vout1 and Vout2 are subtracted from each other in the subtractor 40 to form a signal Vdiff, which is input to a second comparator Comp2, designated by reference numeral 46. The reference numerals 32 and 42 may designate filter means, which, however, are optionally provided. In the comparators 34 and 46, a comparison of the respective input signals is made to pre-set signals. By this, the signals may be digitized such that the output signals of the comparators 34 and 46 are either 0 or have a pre-set on-level. Then, the output signals of the comparators 34 and 46 are input to an logical unit 36 (such as an XOR gate), which forms the output signal Vdig. To activate the test mode of the sensor, for example, the output signal Vdig may be used. In the test mode, the magneto-resistive sensor may be tested and, for example, an offset may be compensated for. Furthermore, variances caused by, for example, manufacturing of the sensor, may be compensated for in the test mode.

Figure 4:
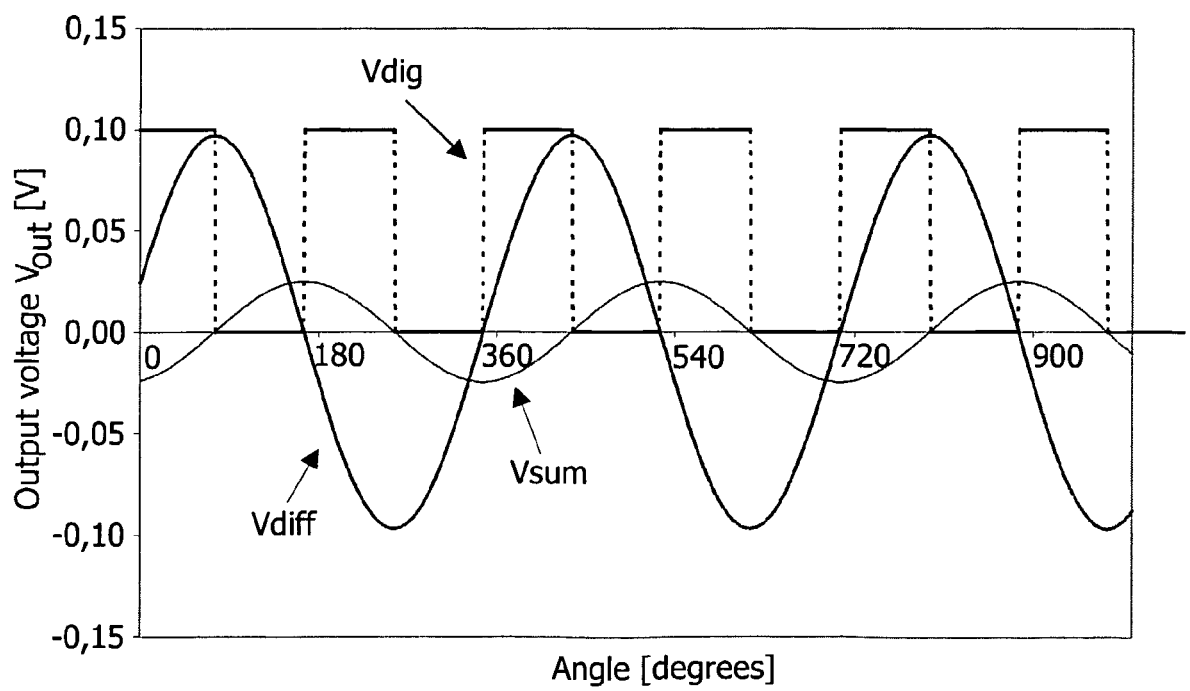
FIG. 4 is a voltage versus angle diagram, showing signals occurring in the circuitry depicted in FIG. 3.

FIG. 4 shows a voltage versus phase angle diagram of signals occurring in the circuitry depicted in FIG. 3. As may be taken from FIG. 4, and as also indicated in FIG. 3, the output signal of the subtractor 40, namely signal Vdiff as well as the output signal of the adder 30, namely the signal Vsum are sinusoidal. A comparison of both signals Vdiff and Vsum shows that a phase difference between both signals is 90° or $\pi/2$. The output signal Vdig is a square wave, having a constant frequency. The signals Vout1 and Vout2 have a phase difference which depends on the geometrical adaptation, i.e. on the difference x at which the respective magneto-resistive elements are arranged. Furthermore, the phase difference may depend on, for example, a width of a pair of poles of a magnetized encoder of the sensor element.

The application of an inhomogeneous magnetic field during operation mode of the sensor systems causes a phase difference of, for example, 60° to 120°, which may, for example, be further processed.

Advantageously, due to the circuit arrangement shown in FIG. 3, where the signals Vout1 and Vout2 are summed and subtracted, the signals Vsum and Vdiff have a phase difference of exactly or essentially 90° or $\pi/2$. If, however, a homogenous magnetic field is applied to the magneto-resistive elements arranged as shown in FIGS. 1 and 2 and attached to the circuitry as depicted in FIG. 3, a phase difference of the signals Vsum and Vdiff is either essentially 0° or 180°, i.e. 0 or $\pi$. Furthermore, depending on the orientation of the homogenous magnetic fields, one of those signals Vsum and Vdiff may have a reduced or increased signal level or amplitude. For example, an amplitude of one of signals Vsum and Vdiff may be 0, whereas the respective other signal of the signals Vsum and Vdiff has a normal amplitude comparable to the operational mode or an increased amplitude. According to an exemplary embodiment of the present invention, the third processing unit is thus adapted to activate the test mode when a phase difference between Vsum and Vdiff is either 0 or 180°. Furthermore, the third processing unit may be adapted to activate the test mode when one of the signals Vsum or Vdiff has a signal level falling below a pre-set level.

According to a variant of this exemplary embodiment of the present invention, during application of the homogenous magnetic field and due to one of signals Vsum and Vdiff having an amplitude of almost 0, a pre-determined amount of edges of, for example, signal Vdig or one of the signals Vsum and Vdiff may be determined before switching to the test mode. During the test mode, when the homogenous magnetic field is applied to the magneto-resistive elements, the sensor may be rapidly tested and trimmed.

According to an exemplary embodiment of the present invention, when the application of the homogenous magnetic field is stopped, the test mode is automatically deactivated by the homogenous magnetic field ceases or when an inhomogeneous magnetic field is applied to the sensor, the third signal processing unit may be adapted to automatically switch back to operational mode.

A homogenous magnetic field may, for example, be generated by coils having a Helmholtz arrangement. Due to this, according to an exemplary embodiment of the present invention, a simple device for at least one of testing and trimming of a magneto-resistive sensor may be provided, having a coil arrangement adapted to generate a homogenous magnetic field. This may allow for a very simple method for at least one of testing and trimming the magneto-resistive sensor according to an exemplary embodiment of the present invention. For activating the testing and trimming mode of the magneto-resistive sensor, a homogenous magnetic field is provided to the magneto-resistive elements of the magneto-resistive sensor. Then, the testing and/or trimming, such as offset adjustment, may be performed. Then, the homogenous magnetic field may be switched off or an inhomogeneous magnetic field may be applied to the sensor to switch the sensor back to the operation mode, i.e. the cease the test mode.

The invention claimed is:

1. Magneto-resistive sensor, comprising:
   a first plurality of first magneto-resistive elements; a second plurality of second magneto-resistive elements;
   a first signal processing unit which is connected to the first plurality of first magneto-resistive elements for generating a first output signal;
   wherein the first output signal has a first phase;
   a second signal processing unit which is connected to the second plurality of second magneto-resistive elements for generating a second output signal;
   wherein the second output signal has a second phase;
   wherein the sensor has an operation mode and a test mode;
   a third signal processing unit for processing the first and second output signals;
   wherein the third signal processing unit is adapted to activate one of the operation mode and the test mode on the basis of the first and second output signals; and
   wherein, when the first and second plurality of first and second magneto-resistive elements are exposed to an homogeneous magnetic field, the third signal processing unit is adapted to activate the test mode.

2. The sensor of claim 1, wherein the third signal processing unit is adapted to activate the test mode when a phase difference between the first phase and the second phase is essentially one of 0 and $\pi$.

3. The sensor of claim 1,
   wherein the first plurality of first magneto-resistive elements form a first bridge generating a first bridge signal;
   wherein the second plurality of second magneto-resistive elements form a second bridge generating a second bridge signal;
   wherein the first processing unit includes an adder for adding the first and second bridge signals;
   wherein the second processing unit includes a subtractor for subtracting the first bridge signal from the second bridge signal; and
   wherein the third signal processing unit is adapted to activate the test mode when a signal level of one of the first and second output signals is below a preset level.

4. The sensor of claim 1,
   wherein the first and second pluralities of first and second magneto-resistive elements are geometrically displaced with respect to each other;
   wherein the sensor is one of a position sensor, revolution speed sensor and angle sensor, in particular for automotive applications; and
   wherein, in the test mode, the first and second pluralities of first and second magneto-resistive elements are adjustable.

5. The sensor of claim 1,
   wherein the third signal processing unit is adapted to activate the operation mode when the first and second plurality of first and second magneto-resistive elements are at least one of no longer exposed to the homogenous magnetic field and exposed to the inhomogeneous field; and wherein the first and second plurality of first and second magneto-resistive elements are arranged such that in the operation mode, an exposure of the first and second plurality of first and second magneto-resistive elements to an inhomogeneous magnetic field causes a phase difference of essentially $\pi/2$ between the first and second phase.

6. Method of operating a magneto-resistive sensor, the magneto-resistive sensor comprising:

a first plurality of first magneto-resistive elements;

a second plurality of second magneto-resistive elements; a first signal processing unit which is connected to the first plurality of first magneto-resistive elements for generating a first output signal;

wherein the first output signal has a first phase; a second signal processing unit which is connected to the second plurality of second magneto-resistive elements for generating a second output signal;

wherein the second output signal has a second phase; wherein the sensor has an operation mode and a test mode; a third signal processing unit for processing the first and second output signals; and wherein the third signal processing unit is adapted to activate one of the operation mode and the test mode on the basis of the first and second output signals; the method comprising the step of:

activating the test mode when an homogeneous magnetic field is applied to the first and second plurality of first and second magneto-resistive elements.

* * * * *